Feb. 28, 1933.  E. H. NICHOLS  1,899,713
PARACHUTE PACK
Filed Nov. 7, 1929  6 Sheets-Sheet 1

INVENTOR.
Erwin H. Nichols.
BY Lancaster and Allwein
ATTORNEYS.

Feb. 28, 1933. E. H. NICHOLS 1,899,713
PARACHUTE PACK
Filed Nov. 7, 1929 6 Sheets-Sheet 3

INVENTOR.
Erwin H. Nichols
BY
ATTORNEYS.

Feb. 28, 1933.    E. H. NICHOLS    1,899,713
PARACHUTE PACK
Filed Nov. 7, 1929    6 Sheets-Sheet 4

INVENTOR.
Erwin H. Nichols.
ATTORNEYS.

Feb. 28, 1933.　　　E. H. NICHOLS　　　1,899,713
PARACHUTE PACK
Filed Nov. 7, 1929　　　6 Sheets-Sheet 5

Fig. 7.

INVENTOR.
Erwin H. Nichols.
BY
ATTORNEYS.

Patented Feb. 28, 1933

1,899,713

UNITED STATES PATENT OFFICE

ERWIN HOUSE NICHOLS, OF BROOKS FIELD, TEXAS, ASSIGNOR TO IRVING AIR CHUTE COMPANY, INC., OF BUFFALO, NEW YORK, A CORPORATION

PARACHUTE PACK

Application filed November 7, 1929. Serial No. 405,388.

This invention relates to improvements in parachute apparatus.

The primary object of this invention is the provision of an improved parachute pack which includes a flexible or semi-flexible container adapted to releasably house a parachute in a compactly folded position therein; the container comprising a body with one or more flaps connected therewith, and a releasable flexible closure having an improved rip-cord assemblage associated therewith whereby the container is insured against accidental opening, but is easily and quickly opened for quicker release of the parachute therein than is possible with standard parachute equipment such as set forth in U. S. Patents Nos. 1,340,423; 1,554,192, and 1,560,366.

A further object of this invention is the provision of parachute apparatus, in pack form, of the general type set forth in U. S. Patent 1,554,192, but embodying improvements thereover, in the nature of a releasable closure which enables a pilot parachute to be ejected faster and farther from the pack, upon opening of the latter, than is possible with standard parachute equipment.

A further object of this invention is the provision of improvements in parachute packs which includes a flexible or semi-flexible container adapted to releasably house the parachute; the container having closure means, such as flaps and the like, to which the rip cord apparatus or operating means is connected in such a relation that the container closure is pulled quickly out of the way of the ejecting parachute upon a release opening of the container.

A further object of this invention is the provision of an improved parachute container of the flexible pack type generally set forth in Patent No. 1,554,192, embodying improvements thereover in the provision of a detachable closure adapted to releasably cooperate with flaps of the container, and with rip cord apparatus, so as to eliminate stiffening means in the flaps of the container, and do away with conventional container flap opening elastics and housings and eyes therefor, such as is part of standard equipment of United States Government parachute apparatus, as set forth in U. S. Patent Nos. 1,462,456 and 1,554,192.

A further object of this invention is the provision of improved rip cord means for parachute apparatus, of the pack type.

A further object of this invention is the provision of an elastic means for safetying the rip cord of a parachute pack to prevent the accidental opening thereof.

A further object of this invention is the provision of an improved parachute pack which enables a more efficient and expeditious packing and tucking away of the main and pilot parachutes.

A further object of this invention is the provision of improved parachute apparatus utilizing a rip cord construction which upon a release pull is not detached from the parachute apparatus worn by the user.

Other objects and advantages of this invention will be apparent during the course of the following detailed description.

In the accompanying drawings, forming a part of this specification, and wherein similar reference characters designate corresponding parts throughout the several views.

Figure 6:
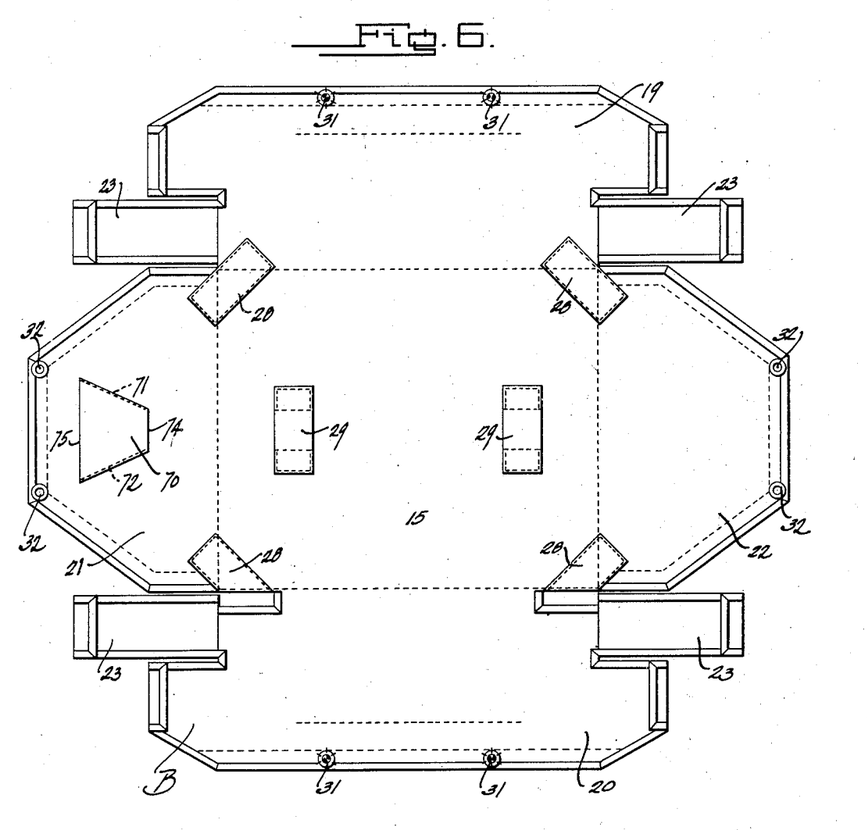
Figure 6 is an external plan view of the parachute container, showing the flaps open and in the same plane with the body portion.
Figure 7:
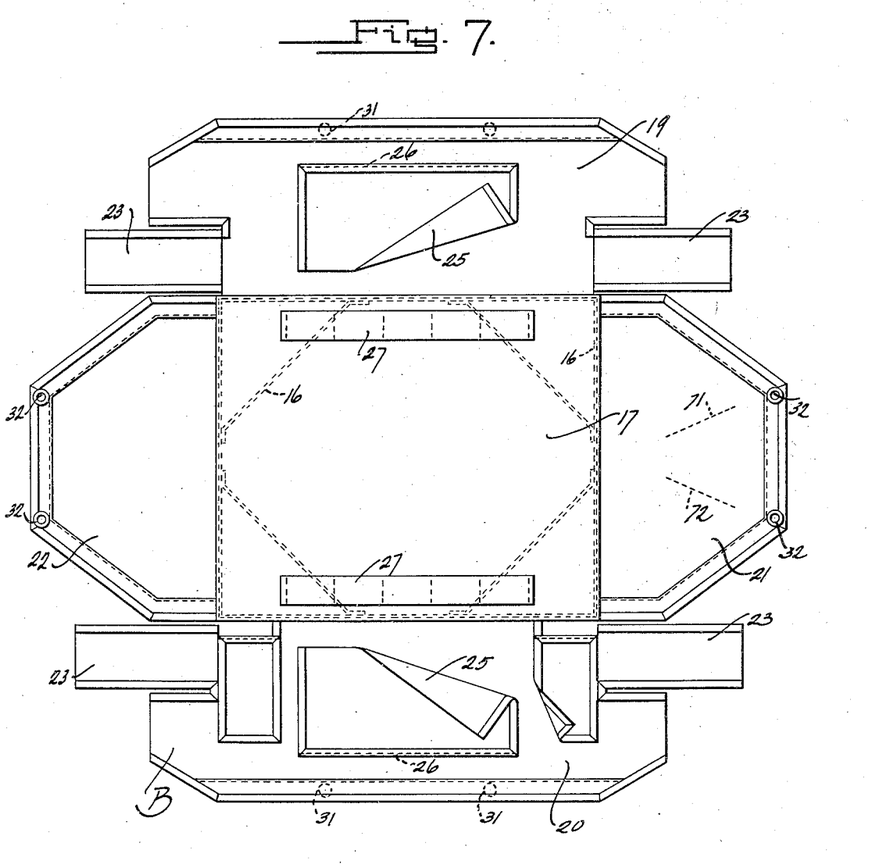
Figure 7 is a plan view of the inside of the container with its parts positioned as shown in Figure 6.

In the drawings, wherein for the purpose of illustration is shown only a preferred embodiment of the invention, the letter A may generally designate the complete parachute pack, which may include a container B, shown best in Figures 6 and 7 of the drawings, wherein the shroud lines and main parachute C are adapted to be packed in accordance with standard practice, more particularly set forth in Patent No. 1,554,192. A pilot parachute D is connected with the main parachute C, for the well known purpose of straightening out the main parachute upon release of the container by means of the rip cord. An improved rip cord E is used for maintaining the container releasably closed and holding the main and pilot parachutes therein.

Referring to the container B, the same possesses the general characteristics set forth in U. S. Patent No. 1,554,192, and includes a back or body portion 15, which may be of any shape, but is preferably rectangular. The material of the container B is preferably textile woven fabric, water-proof if desired. The body 15 has a wire frame 16 co-extensive therewith, secured in place within a pocket formed by sewing an inside flexible fabric wall 17 in place about the margins of the back or body portion 15, as shown in Figure 7 of the drawings. This wire frame may be removable if desired, and it holds the back of the container in shape, upon which the details may be assembled to provide the pack. End flaps 19 and 20 are provided at opposite edges of the body or back of the pack container B, as shown in Figures 6 and 7. Similarly side or end flaps 21 and 22 may be provided at the remaining opposite sides of the back portion 15. These flaps 19 to 22 inclusive may be suitably reinforced about their margins, and of course are flexible so that they may be folded about and upon the folded parachute upon the back 15. The end flaps 19 and 20 at the sides thereof may be provided with suitable auxiliary flaps or tongues 23, for folding inside of the container along the insides of the flaps 21 and 22, to provide built-up corners for the pack, although this is a feature which has been set forth in U. S. Patent No. 1,554,192, above mentioned.

The end flaps 19 and 20 are provided with flexible separator flaps 25, hinged at 26 near the free marginal portions of the flaps 19 and 20, and which flaps 25 are provided to overlap upon the main parachute, when the container is folded thereabout, to separate the pilot parachute from the main parachute.

The container B may otherwise contain conventional features, and it has pocket providing strips 27 paralleling adjacent to the connecting edges of the flaps 19 and 20, for receiving the ends of the shroud lines in a releasably tucked relation therein, in a manner which is well known in this art. Furthermore, the outer surface of the pack container B may be provided with reinforcing corner pieces 28 and harness attaching loops 29 on the back or body 15.

Figure 1:
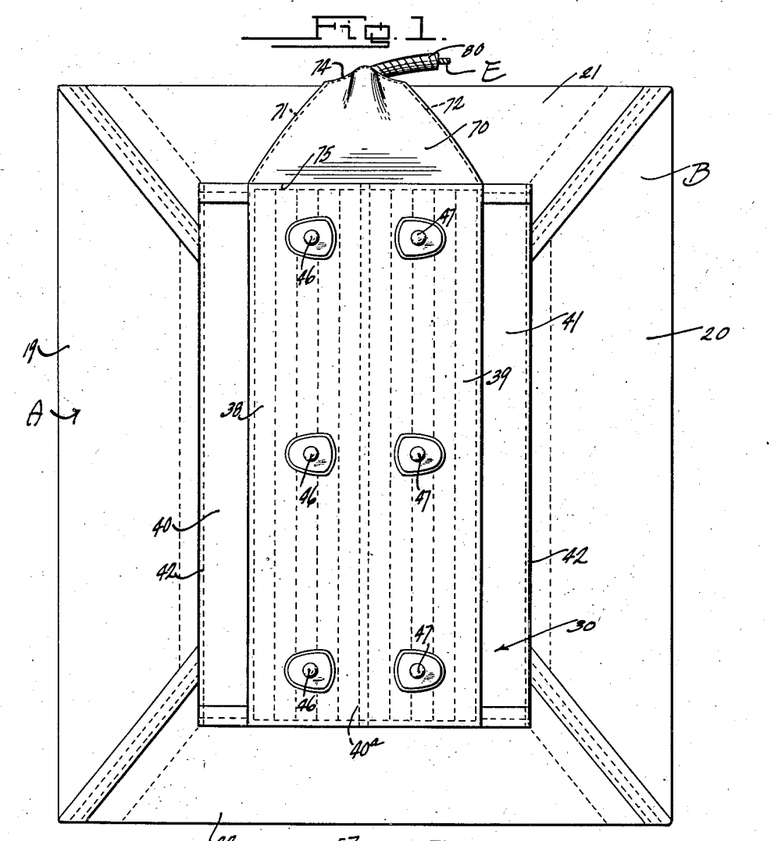
Figure 1 is a plan view of the parachute pack, showing it in its closed condition.
Figure 2:
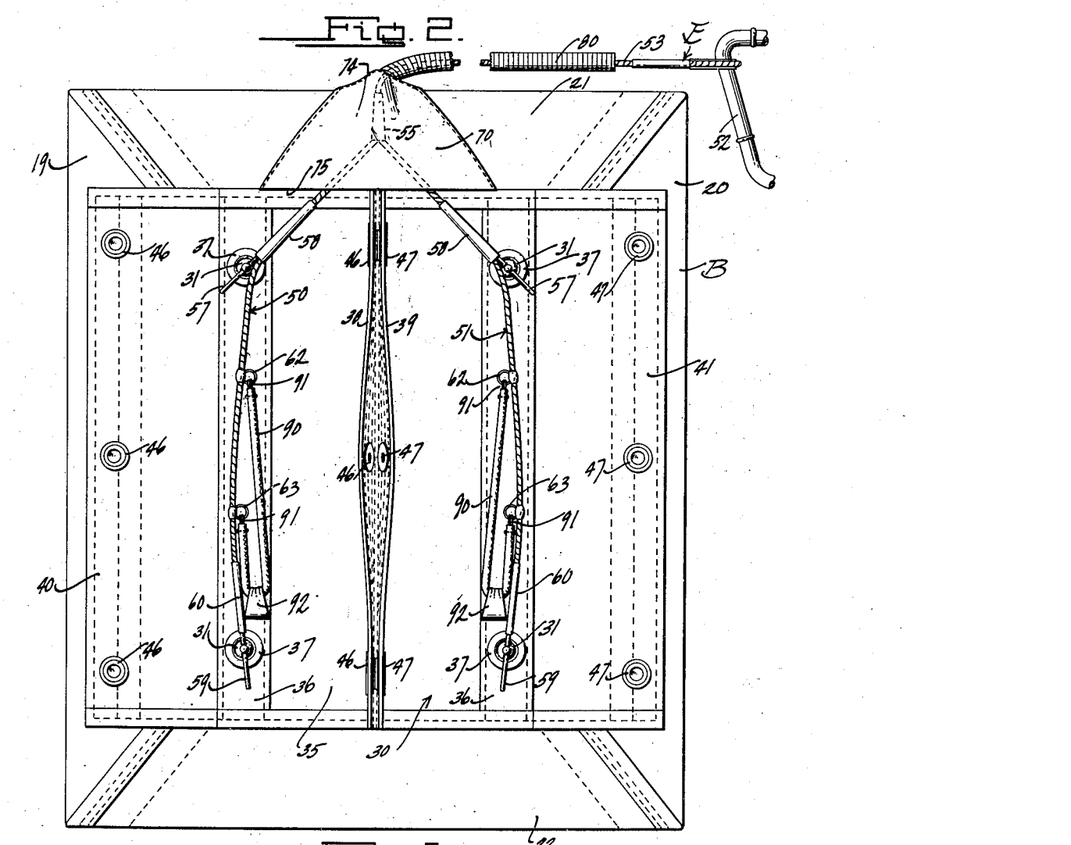
Figure 2 is a plan view of the parachute pack, in its closed condition, showing the guard flaps open for exposing the detent relation of the rip cord upon the pack container.
Figure 3:
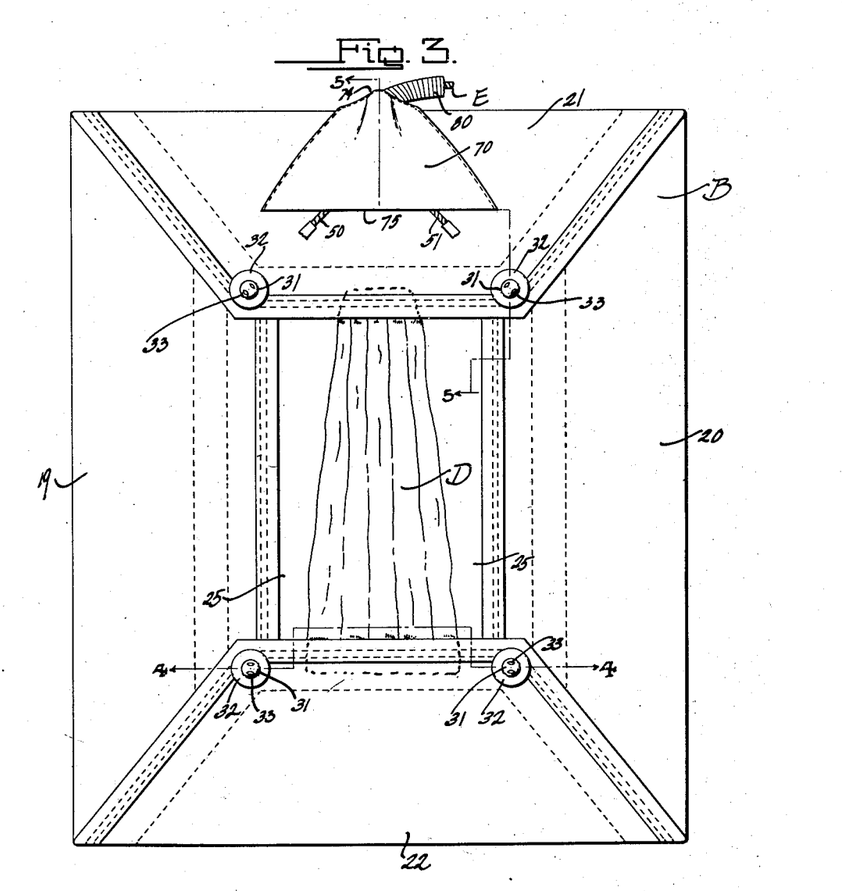
Figure 3 is a plan view of the parachute pack, showing the same with an improved releasable patch or covering member removed from the pack, and exposing the pilot parachute in its packed condition in the container.

Referring to the above described arrangement of the pack container, the main parachute is of course packed upon the inside of the back or body 15, and the flaps 19 to 22 are folded about the sides; the flaps 19 and 20 being first folded in position and then the other end flaps 21 and 22. In contradistinction to the container of the standard form of pack shown in U. S. Patent #1,554,192, it is to be noted that the free ends of the opposing sets of flaps 19 and 20, and 21 and 22, do not meet, as shown in Figure 3. Thus, the said flaps are of only such length from their connected ends on the body 15 to their free ends that they will enfold about the sides and partially overlap the parachute. This leaves an opening in the central portion of the container which is adapted to be releasably closed by the detachable closure piece 30, shown in Figures 8 and 9 of the drawings, and in position in Figures 1 and 2. This closure has a four-point release connection. To this end, the end flaps 19 and 20, as is shown in Figure 6 of the drawings, are each provided with pairs of spaced tapered projections 31, constituting the stud portions of releasable fasteners, which are adapted to cooperate within grommet or eyelet fastener parts 32 provided in pairs on the outer or free portions of each of the flaps 21 and 22, as shown in Figures 6 and 7 of the drawings. The flaps 19 and 20 are folded about the main parachute and thereafter the flaps 21 and 22 are folded about the packed main parachute and the eyelets 32 slipped over the projections 31. On the normal outer face of the pack this provides a four-point release fastening arrangement, for the flaps of the container, as is well shown in Figure 3 of the drawings. Of course, the projections 31 fit through the eyes 32; the projections being each provided with transverse openings 33 therethrough, for receiving a pin portion of the rip cord, as a means of holding the flaps together, since the latter are under considerable tension when the parachute is packed therein. These pins have been omitted from the showing in Figure 3.

Figure 4:
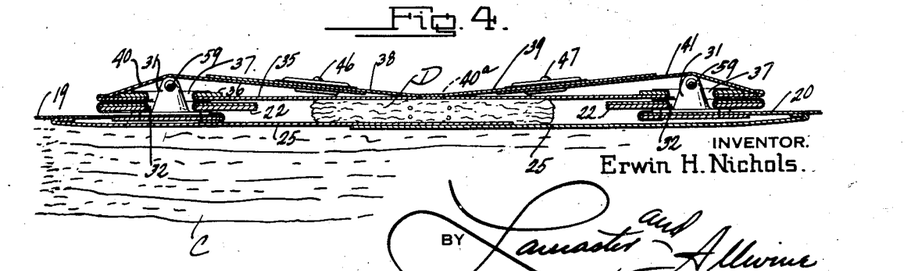
Figures 4 and 5 are cross sectional views taken substantially on their respective lines in Figure 3 of the drawings, and additionally showing the cover, not shown in Figure 3.

In the position of parts shown in Figure 3, as can better be understood from Figure 4, the inner tongues or flaps 25 have been folded over the main parachute C, across the opening between the facing free ends of the flaps 19 to 22 inclusive, thus closing off the main parachute, and on top of these flaps 25 the pilot parachute D is adapted to be packed, preferably with its peak between the flaps 25 and one of the flaps 21 or 22, and its opposite end tucked between the flaps 25 and the other flap 21 or 22, as the case may be, and as can readily be understood from Figure 3 of the drawings.

At this point it may be well to mention that the improved pack is adapted to be used as a seat, back, lap, chest, or other type of pack. When used as a seat or lap type the flap 21 will be at the side of the wearer, as may also be the case when used as a chest pack if desired. However, when used as a back pack the flap 21 will face upwardly at the back of the wearer.

Figure 8:
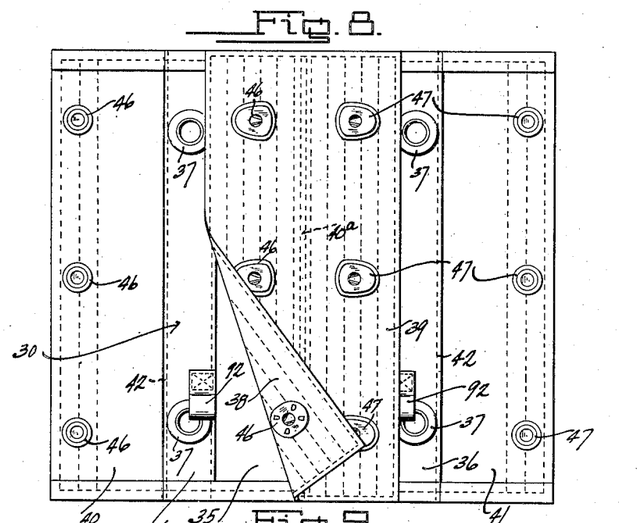
Figure 8 is an outer plan view of the improved closure patch or cover of the parachute pack, with the guard flaps opened.
Figure 9:
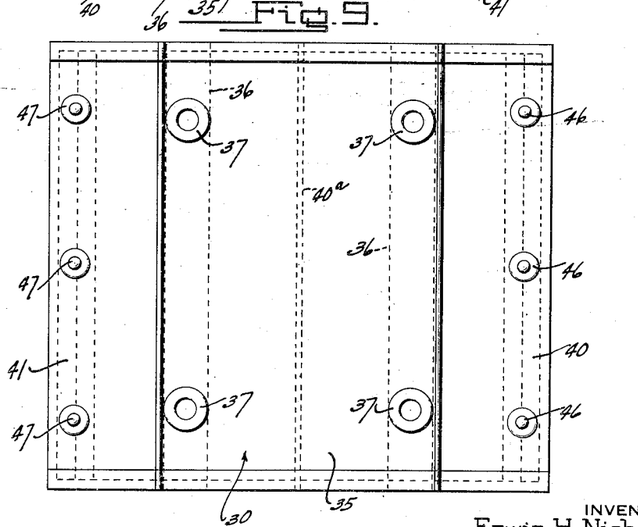
Figure 9 is a plan view of the under side of the closure of Figure 8.

Referring to the closure 30, the same is of rectangular shape, and complemental with the flaps 19 to 22 inclusive, in providing a complete container for compactly positioning the parachutes therein. It is detachable with respect to the container, and is attachable to the container only through the intermediary of the releasable fastening parts 31 and 32, and of course the rip cord E. As shown in Figures 8 and 9 of the drawings, the patch or closure 30 consists of a flexible polygonal body portion 35, preferably in rectangular form, which has marginal reinforcing strips 36 extending along opposite sides thereof, and through which, and the body 35, grommets or eyelets 37 are provided, at the corners of the body 35, in a properly spaced relation for receiving the stud portions 31 of the fastening devices of the pack container therein, when the pack is in the form shown in Figure 3. This body portion 35 is held upon the pack container and closes the same and covers the pilot parachute; being held in place by the rip cord pins in a manner to be subsequently detailed. Guard flaps 38 and 39 are secured as by stitching 40ª upon the body 30 along a line about midway between the fastening devices 37, extending in opposite directions and adapted to cooperate with other flexible guard flaps 40 and 41 respectively, which are hinged or secured at 42 along the opposite margins of the body 35. The flaps 38 and 40 are provided with complementary snap fastener portions 46 thereon, of the manually operated spring-friction "lift the dot" type, and similarly the flap portions 39 and 41 have complementary "lift the dot" snap fastener parts 47 for securing the same. These guard flaps are provided for the purpose of protecting the fastener parts of the pack container against injury, and for housing the two fastening links 50 and 51 of the rip cord E, against accidental removal, and from direct contact with clothing of the wearer, or other foreign parts.

Figure 10:
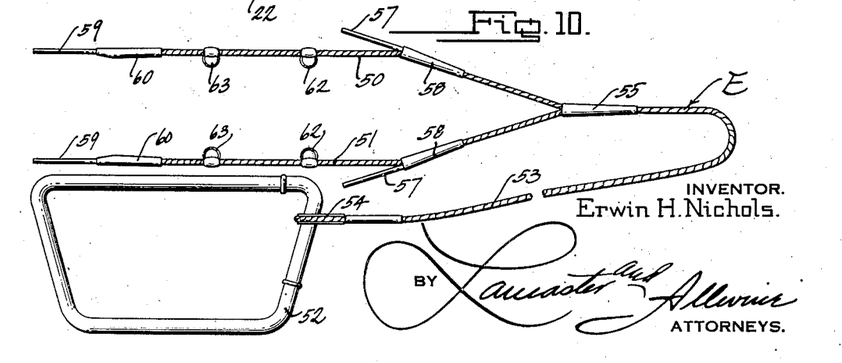
Figure 10 is a fragmentary plan view of the improved rip cord.

Referring to the rip cord E, the same includes a handle 52, which may be of the ring type, or of the type set forth in application, Serial No. 319,934, filed in the U. S. Patent Office November 16, 1928. To the handle 52 is attached a length 53, of flexible rip cord wire or other material, as at 54. At the end of the body 53 of the rip cord, opposite the handle 52, the links 50 and 51 are attached at a connection 55, which may be of the usual type of wound wire and soldered connection. Thus, the flexible rip cord is of a bifurcated end construction. Each of the flexible rip cord portions 50 and 51 are provided with similarly positioned, preferably rigid, free end retaining pins 57, secured at 58 near the connection 55, the same extending outwardly in a general direction of the free ends of the flexible portions 50 and 51. The latter at their free ends are provided with other free end, preferably rigid, retaining pins 59, secured at 60. On the flexible portions of the rip cord links 50 and 51, between the pins 57 and 59, each of said links 50 and 51 is provided with a pair of relatively spaced loops or eyes 62 and 63, respectively adjacent the retaining pins 57 and 59, as can be seen from Figure 10 of the drawings.

Referring to the attachment of the rip cord upon the pack, the flap 21 upon the outer side thereof is provided with a substantially frusto-conical shaped pocket 70, which is secured by stitching 71 and 72 at opposite sides thereof; the lines of stitching 71 and 72 relatively converging from the free end of the flap 21 in the direction of the connection of the said flap with the body 15, as well shown in Figure 6. Otherwise the flap 70 defines a pocket upon the outer side of the flap 21, which is open at 74 and 75; the latter being the larger end and facing the free end of the flap 21.

Figure 5:
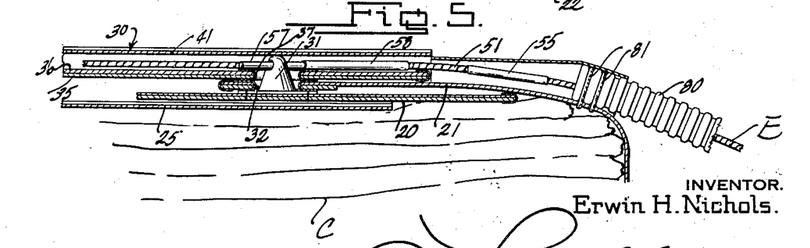

A flexible rip cord housing 80 is provided, the same being of the armoured metal type, longitudinally flexible, but not radially collapsible, and is adapted to receive the body portion 53 of the rip cord E therethrough. The housing 80 is secured upon the flap 21, as by looping stitched thereto, at 81, in Figure 5; the end which is attached being extended through the smaller end 74 beneath the pocket flap 70. The longitudinally flexible housing 80 and rip cord handle may extend to any convenient location upon the apparel or harness of the wearer. As is shown in Figure 2, the bifurcated rip cord has the end portions 50 and 51 extending at opposite sides of the hinged connection 40ª of the guard flaps 38 and 39; the connection 50 having the retaining pins 57 and 59 thereof secured thru the openings 33 of the studs 31 of the flap 19 of the pack, and the pins 57 and 59 of the other flexible portion 51 of the rip cord extending through the transverse openings 33 of the studs 31 of the container flap 20. Of course, the studs 31 are extended thru the eyelets of the flaps 21, 22 and the closure 30, in the relation above described, and as shown in Figure 2. The guard flaps 38, 40, 39 and 41 may then be positioned in a guarding relation over the links 50 and 51, to prevent accidental release of the parachute container; this guarded relation of the rip cord being shown in Figure 1 of the drawings, and it is especially noticeable that the guard flaps 38 and 39 overlap the guard flaps 40 and 41 respectively, and cooperate with the tapered pocket 70 in completely housing the rip cord at its connection upon the container B.

As an improved feature of parachute fastener construction, each of the links 50 and 51 of the parachute rip cord are provided with an elastic safetying member 90, the ends of which have fastening hooks or similar devices 91 thereon, adapted to hook over the fastening eyes 62 and 63. These elastics 90 are longitudinally extensible, and the material may be rubber, fabric coated to protect the same against deterioration. Flexible fabric loops or other fastening parts 92 are secured upon the body portion 35 of the closure 30, close to those eyelets 37 which receive the cones 31 that are adapted to slip through the eyelets of the flap 22. These loops 92 have the elastics 90 slipped therethrough, the said elastics 90 being placed under tension and hooked over the eyes 62 and 63; it being obvious that the tensioning of the same will pull the rip cord portions 50 and 51 longitudinally of their respective axes, in a direction away from the rip cord handle, for urging the pins 57 and 59 in a non-release direction into the studs 31. It is to be noted that the elastics 90 are under considerable tension. The wire material of the rip cord is of the conventional type that has been in use for years. While it will flex under certain forces, yet it is of sufficient inherent rigidity so as not to collapse upon the application of the pull of the elastics 90.

As to the operation of the pack, the usual procedure is for the wearer, in making a premeditated or emergency jump, to leap from the aircraft, and when sufficiently spaced from the aircraft to manually pull the rip cord handle 52. This pulls the rip cord body 53 longitudinally through the housing 80, counter to the normal tendency of the safetying elastics 90. The pull will be sufficient to further tension the elastics 90 and release the pins 57 and 59 from the transverse openings of the respective studs 31 in which seated. The operator's pull is sufficient that the manual effort will completely throw the flap 21 into its open position away from the packed parachute, and the cover flap 30 now having been released from the container B, will be quickly and automatically collapsed by reason of the pre-existing tension of the elastics 90, and thus throwing the flap 30 immediately out of the way of the pilot parachute D, and the main parachute, permitting the pilot parachute D to be ejected without obstruction. If a spring operated pilot parachute is used, it has been noted, due to the quick action with which the flap 21 and the closure flaps 30 are removed, the pilot parachute spring will throw the pilot parachutes for a greater distance than the pilot parachute under similar conditions used with the standard form of government pack, and resulting in a quicker and more effective opening of the pilot parachute. The effort used by the operator in releasing the pack by pulling the rip cord, will, due to the fact that the flap 21 is manually thrown open, cause a quicker ejection of the pilot parachute.

It is to be particularly noted that the pilot parachute D may be packed differently than shown in Figure 3, since if a spring operated pilot parachute is not used, it may be desired to place the collapsed pilot parachute within the opening bounded by the free edges of the four flaps 19 to 22 of the parachute, merely covering the same with the detachable closure patch 30, and thus leaving the pilot parachute free of any obstruction whatsoever by flaps of the container when the operator has pulled upon the rip cord so as to throw the flap 21 and closure 30 laterally out of the way of the pilot parachute.

From an operation of the improved parachute pack it results that the pilot parachute, in event one is used, is thrown with greater speed, and farther, than a pilot parachute as used with the standard form of pack now in use, as exemplified in the U. S. Patent #1,554,192 above mentioned. The feature of connecting the rip cord in the relation described to one of the flaps of the container and so that the cover flap 30 is removable upon manual pull of the rip cord, out of the way of the contents of the pack, enables the elimination of long closure flaps, thus doing away with the necessity of form-providing stiffness in the flaps. Also, flap opening elastics, their housings, and eyes and hooks therefor, are done away with. The rubber safetying cords 90 prevent accidental opening of the pack, and additionally aid in collapsing the closure patch 30 to quickly throw it aside as soon as the rip cord is pulled. The improved arrangement of pack and container parts enables the parachute to be more efficiently packed and tucked away. Also, due to the connection of the rip cord and its connection by means of the elastics with the removable closure flap 30, neither the latter nor the rip cord will be lost upon an opening of the parachute, and this is an advantage, since with the present standard parachute pack, the rip cord is almost always detached and lost. Wide spacing of the release points upon the pack, as exemplified in the four-point release permits the container to fit snugly about the packed parachute and prevents the pack flaps from working loose and exposing the silk, especially at the corners of the pack.

Various changes in the shape, size, and arrangement of parts may be made to the form of invention herein shown and described, without departing from the spirit of the invention or the scope of the claims.

I claim:

1. A container or cover for a parachute made of flexible material and comprising a body portion having marginal flaps thereabout, a semi-rigid frame co-extensive with and holding the body portion in shape for packing of a parachute thereon, and a detachable cover, the cover and flaps only having cooperative fastener parts thereon, and means for releasably connecting the fastener parts for holding the cover and flaps in container formation for compactly housing the parachute therein upon said body.

2. In a parachute pack the combination of a container, a parachute for the container, and releasable fastening means for closing the container upon the parachute including a rip cord, and extensible elastic means connecting the rip cord with the container and urging the rip cord in a safetied retaining relation with the remainder of the fastening means.

3. In a parachute pack the combination of a container including a body portion and flexible flaps, a detachable flexible cover, a plurality of fastening devices including complementary male and female parts solely connected with the free ends of the flexible flaps and said cover, and a rip cord device for operating the fastener devices to release the cover from said flaps.

4. In a parachute pack the combination of a container having parachute enclosing flaps, a detachable flexible cover, a plurality of fastening devices including complementary male and female parts connected solely with the free ends of the flaps and said cover, a rip cord device for operating the fastener devices to release the cover from said flaps, said rip cord device having a connection with one of the flaps for throwing the latter positively open upon release pull of the rip cord.

5. In a parachute pack the combination of a container having parachute enclosing flaps, a detachable cover, a plurality of fastening devices including complementary male and female parts connected with the free ends of the flaps and said cover, a rip cord device for operating the fastener devices to release the cover from said flaps, said rip cord device having a non-detachable connection with one of the flaps for throwing the latter positively open upon release pull of the rip cord, said rip cord device having a positive connection with said cover for moving the latter away from the container in an unobstructed relation with respect to the parachute to be released therefrom.

6. In a parachute pack the combination of a container including a parachute housing portion provided with cooperating flaps adapted to releasably fold about a main parachute, a detachable cover, means releasably connecting the detachable cover and flaps in a container-like arrangement, a pilot parachute in the container immediately beneath the cover and having an operative connection with the main parachute, said releasing means including a rip cord having a positive connection with the cover for drawing the latter in unobstructed relation off the pilot parachute as an incident of pull of the rip cord to open the container.

7. In a parachute pack the combination of a container including a parachute housing portion provided with cooperating flaps adapted to releasably fold about a main parachute, a detachable cover, means releasably connecting the detachable cover and flaps in a container-like arrangement, a pilot parachute in the container immediately beneath the cover and having an operative connection with the main parachute, said releasing means including a rip cord having a positive connection with the cover for drawing the latter in unobstructed relation off the pilot parachute as an incident of pull of the rip cord to open the container, and means providing a connection of the rip cord with one of said flaps for moving said flap together with the cover laterally away from the folded parachute upon pull of the rip cord.

8. In a parachute pack the combination of a container adapted to house a folded parachute therein including a flexible detachable cover portion, fastening means for releasably fastening the cover with the container, and elastic means to collapse the cover upon a release operation of said fastening means.

9. In a parachute pack the combination of a body upon which a folded parachute is adapted to be packed, marginal flexible flaps connected about said body, the same being relatively short and adapted to fold laterally about the folded parachute and over upon the parachute opposite the body, with opposed flaps having their free ends spaced, auxiliary separating pieces over the main parachute in the space between the free ends of said flaps and folded in container-like arrangement upon the main parachute, a pilot parachute resting in said space, a closure member releasably connected with the free ends of said flaps and housing the pilot parachute therebeneath, releasing means including a rip cord for removing the cover and opening the flaps, means to collapse the cover upon release of the same, and means connecting the rip cord with a flap for moving said flap laterally out of the way of the folded parachute upon release of the container.

10. In a parachute pack container the combination of a body, flaps marginally connected about the body, said flaps being inherently flexible, a flexible and collapsible cover smaller than said body, and a plurality of fastening devices releasably connecting only the free ends of the flaps and the corners of said cover and being free of any connection with said body.

11. In a parachute pack container the combination of a body, flaps marginally connected about the body, said flaps being inherently flexible, a flexible and collapsible cover smaller than said body, and a plurality of fastening devices releasably connecting only the free ends of the flaps and the corners of said cover with a four-point release connection.

12. As an article of manufacture, a rip cord including a body provided with a detent pin, and an extensible elastic safetying cord connected with the body of the rip cord.

13. As an article of manufacture a rip cord device including a flexible body provided with a detent pin thereon, and an elastic safetying cord having means for connecting its ends on the body.

14. In parachute pack container fastening devices the combination of a container having complementary closure parts, one provided with an eyelet and the other with a stud releasably extensible into the eyelet, the stud having a transverse opening therein at the end which extends beyond the eyelet, a flexible wire rip cord including a detent pin extensible through the opening of the stud, and an elastic safetying cord connected under tension between the flexible wire rip cord body and container and urging the detent pin into a retaining relation with the stud.

15. In a parachute pack the combination of a container adapted to house a folded parachute and including a plurality of fastening devices for the complementary parts of the container at each side of the medial line of the pack, a rip cord including flexible wire portions provided with detent pins for said fastening devices, and elastic safetying devices connected with the pack and said rip cord for holding the detent pins in a retaining relation with said fastening devices.

16. In a rip cord the combination of a flexible wire body having detent pins thereon, an elongated elastic safetying member, and means connecting the ends of said member upon the wire body, one of said ends at least having a detachable connection with said body.

17. In a parachute container a semi-rigid body upon which a folded parachute is adapted to rest, short flexible flaps marginally connected in a polygonal relation about the body for folding thereover, a detachable flexible cover, and complementary fastening portions free of direct attachment with said body and detachably connecting the free ends of the flaps together with the corners of said cover.

18. In a parachute container a semi-rigid body upon which a folded parachute is adapted to rest, short flexible flaps marginally connected in a polygonal relation about the body for folding thereover, a detachable flexible cover, complementary fastening portions free of direct attachment with said body and detachably connecting the free ends of the flaps together with the corners of said cover, and operating means including a single rip cord for simultaneously opening the fastening devices.

19. In a parachute container the combination of a body portion having flexible flaps extending from the marginal edges thereof and adapted to overfold upon the body portion for partial enclosure of a compacted parachute on the body portion, said flexible flaps when enfolded about a parachute having the free edges thereof relatively spaced, locking studs mounted upon the free edges of said flexible flaps, a detachable flexible cover for enclosing the space between the facing edges of the flaps when in container form, said flexible cover having eyelets for receiving said studs therethrough, the studs having transverse openings exposed as extended through the eyelets of said cover, and rip cord means for releasable extension through the openings of said studs for releasably retaining the cover connected upon said flaps.

20. In a parachute container the combination of a main container portion comprising a main body having opposed sets of flexible flaps at the marginal edges thereof, one of said sets of said flaps having the free edges thereof provided with transversely apertured studs, the other set of opposed flaps having eyelets at the free edges thereof for receiving the studs therethrough when the flaps are all overfolded upon the body portion, said flaps being of a length to be relatively spaced from each other at their facing edges when overfolded upon the body of the main container portion with a compacted parachute therein, a detachable flexible cover piece having eyelets for receiving the studs therethrough, and rip cord means associated with said studs and eyelets for releasably maintaining the cover piece and flaps in a connected parachute enclosing relation, said studs and eyelets being free of any connection with the body of the main container portion whatsoever.

21. In a parachute pack, a parachute folded into a compact mass, a main container portion receiving the parachute mass therein, a detachable flexible cover complementary with the main container portion for completely enclosing the parachute mass, a series of releasable fastening devices connecting the main container portion and flexible cover in a parachute mass enclosing relation, a rip cord, means mounting the rip cord upon the main container portion for limited movement thereon merely sufficient to enable a release opening of the container, said rip cord having releasable cooperative connection with said releasable fastening devices for holding the flexible cover and main container portion in a parachute enclosing relation, and safetying means directly connecting the rip cord with the flexible cover.

22. In a parachute pack, a parachute folded into a compact mass, a main container portion receiving the parachute mass therein, a detachable flexible cover complementary with the main container portion for completely enclosing the parachute mass, a series of releasable fastening devices connecting the main container portion and flexible cover in a parachute mass enclosing relation, a rip cord, means mounting the rip cord upon the main container portion for limited movement thereon merely sufficient to enable a release opening of the container, said rip cord having releasable cooperative connection with said releasable fastening devices for holding the flexible cover and main container portion in a parachute enclosing relation, safetying means directly connecting the rip cord with the flexible cover, said safetying means being elastic and permitting movement of the rip cord sufficient to release said fastening devices for opening of the container.

23. In a parachute pack container the combination of a main container portion formed of flexible material comprising a body portion with marginally extending flexible flaps thereabout, a wire frame co-extensive with said body portion and holding the same in semi-rigid condition, said flexible flaps having releasable fastening studs and eyelets at the free edges thereof for interconnection when the flaps are folded over the body portion for housing a parachute therein, said flaps in dimension being such that when folded over the body portion the free edges of oppositely facing flaps will be relatively spaced to provide a substantially central opening in the main container portion at the side of the container where said flaps are folded, a flexible closure piece having fastening eyelets for interconnection with the fastening devices of said flaps, and rip cord means for releasably holding the fastener parts of said flaps and closure together, said fastener parts being free of any connection whatsoever with the body portion of the main container portion.

24. In a parachute pack the combination of an enclosing container having closure parts provided with interengaging studs and eyelets, said studs being transversely apertured, a flexible rip cord having pins for extension through the apertures of the studs for retaining the eyelets on the studs, and an elastic safetying cord connected at its ends upon the rip cord and intermediate its ends having a connection with a part of the container whereby it is held under tension for normally urging the rip cord pin into a retaining relation upon said studs.

25. In a parachute container the combination of a main container portion comprising a body having flexible flaps marginally thereabout, said flaps being in substantially opposed sets, one of said opposed sets on each of the flaps thereof having a pair of transversely apertured studs, the flaps of the other set having eyelets therein for receiving the studs, said flaps when enfolded over the body portion having their facing edges relatively spaced to provide a small opening into said container, and when so arranged the studs and eyelets defining a four-point release in rectangular arrangement, a flexible closure part having eyelets at the corners thereof in rectangular arrangement for receiving the studs therethrough to close the opening to the main portion of said container, and a single rip cord device including flexible branch extensions with locking pins releasably engaging through said studs for retaining the eyelets of the flaps and cover assembled and the container enclosed.

26. In a parachute container the combination of a main container portion comprising a body having flexible flaps marginally thereabout, said flaps being in substantially opposed sets, one of said opposed sets on each of the flaps thereof having a pair of transversely apertured studs, the flaps of the other set having eyelets therein for receiving the studs, said flaps when enfolded over the body portion having their facing edges relatively spaced to provide a small opening into said container, and when so arranged the studs and eyelets defining a four-point release in rectangular arrangement, a flexible closure part having eyelets at the corners thereof in rectangular arrangement for receiving the studs therethrough to close the opening to the main portion of said container, a single rip cord device including flexible branch extensions with locking pins releasably engaging through said studs for retaining the eyelets of the flaps and cover assembled and the container enclosed, and auxiliary guard flaps on the flexible cover for housing the rip cord portions and their connections with the studs and eyelets therein.

27. In a parachute container the combination of a main container portion comprising a body having flexible flaps marginally thereabout, said flaps being in substantially opposed sets, one of said opposed sets on each of the flaps thereof having a pair of transversely apertured studs, the flaps of the other set having eyelets therein for receiving the studs, said flaps when enfolded over the body portion having their facing edges relatively spaced to provide a small opening into said container, and when so arranged the studs and eyelets defining a four-point release in rectangular arrangement, a flexible closure part having eyelets at the corners thereof in rectangular arrangement for receiving the studs therethrough to close the opening to the main portion of said container, a single rip cord device including flexible branch extensions with locking pins releasably engaging through said studs for retaining the eyelets of the flaps and cover assembled and the container enclosed, a main parachute compacted in the container, and a pilot parachute operatively connected with the main parachute and positioned in the opening of the main portion of the container beneath the flexible cover of the container so as to be released upon removal of the flexible cover.

ERWIN H. NICHOLS.